United States Patent
Zhao

(10) Patent No.: US 8,064,929 B2
(45) Date of Patent: Nov. 22, 2011

(54) METHOD OF OPTIMIZING DATA COMMUNICATION DEVICES' AUTO-ON FUNCTIONALITY

(76) Inventor: Wen Zhao, Kanata (CA)

( * ) Notice: Subject to any disclaimer, the term of this patent is extended or adjusted under 35 U.S.C. 154(b) by 246 days.

(21) Appl. No.: 10/702,919

(22) Filed: Nov. 6, 2003

(65) Prior Publication Data

US 2004/0185849 A1    Sep. 23, 2004

Related U.S. Application Data

(60) Provisional application No. 60/424,724, filed on Nov. 8, 2002.

(51) Int. Cl.
*H04Q 7/20* (2006.01)

(52) U.S. Cl. ............ 455/456.4; 455/418; 455/435; 455/453; 455/95; 455/522; 713/310; 713/320; 713/324; 340/539; 340/164; 340/531; 340/573

(58) Field of Classification Search ......... 455/574, 455/573, 571, 572, 343.2, 343.5, 414, 435, 455/522, 91, 92, 93, 95, 453, 418, 456.4, 455/343; 713/310, 320, 324, 300; 707/104.1; 708/112; 340/539, 164, 531, 573, 574

See application file for complete search history.

(56) References Cited

U.S. PATENT DOCUMENTS

| | | | | |
|---|---|---|---|---|
| 4,157,540 | A * | 6/1979 | Oros | 340/539.11 |
| 5,125,080 | A * | 6/1992 | Pleva et al. | 710/305 |
| 6,317,593 | B1 | 11/2001 | Vossler | |
| 6,678,508 | B1 * | 1/2004 | Koilpillai et al. | 455/137 |
| 6,865,683 | B2 * | 3/2005 | Taylor et al. | 713/310 |
| 7,558,557 | B1 * | 7/2009 | Gollnick et al. | 455/343.4 |
| 2003/0104848 | A1 * | 6/2003 | Brideglall | 455/574 |
| 2003/0171106 | A1 * | 9/2003 | Dunworth et al. | 455/262 |

FOREIGN PATENT DOCUMENTS

| | | |
|---|---|---|
| EP | 0 463 621 A1 | 1/1992 |
| GB | 2 371 447 A | 7/2002 |

* cited by examiner

*Primary Examiner* — Patrick Edouard
*Assistant Examiner* — Fred Casca
(74) *Attorney, Agent, or Firm* — Moffat & Co.

(57) ABSTRACT

In a network comprising mobile data devices having corresponding transceivers, a method and apparatus for temporally spreading network traffic associated with auto-on functionality of the data devices, the method comprising activating transceivers of the data devices independently of corresponding data device activation status in an unsynchronized manner.

15 Claims, 3 Drawing Sheets

METHOD OF OPTIMIZING DATA COMMUNICATION DEVICES' AUTO-ON FUNCTIONALITY

CROSS-REFERENCE TO RELATED APPLICATION

This application claims the benefit of U.S. Provisional Application Ser. No. 60/424,724, filed on Nov. 8, 2002, the entire disclosure of which is incorporated herein by reference.

FIELD OF THE INVENTION

This invention relates generally to a method that optimizes data communication devices' auto on functionality. More particularly, the invention provides a method to be practiced at wireless data devices to shape combined network data traffic when a plurality of data devices with auto-on functionality are turned on at the same time.

The data devices referred herein include but not limited to Personal Digital Assistants, mobile communication devices, cellular phones, computers and other two-way communication devices with auto-on/auto-off functionality built in.

BACKGROUND TO THE INVENTION

When a data device is auto-on, it initially registers with the data server. Upon receiving the registration, the data server knows that the data device is active and it is ready for service. The data server will start sending accumulated data traffic to the data device via the data network. When a data device is auto-off, it de-registers with the push data server. The data server usually accumulates the data traffic for the data device during its auto-off period.

Statistics show that a majority of data device users, when using the auto-on functionality, intend to have their devices auto-on within a roughly very short period of time. One peak period for wireless email devices, for example, is at 8:00 am. This is the time when users wake up and want to check their emails received overnight. Another example peak period for wireless stock quotation devices is at 6:00 am. This is the time when stock analysts wake up and check the overseas stock market overnight performance.

Turing on a plurality of data devices at the same time sometimes puts significant traffic on the wireless network and even occasionally brings down the network. One method used to alleviate the impact to the wireless data network when auto-on is used is to keep the devices' transceiver on during the auto-off period so that all the traffic such as emails can still be exchanged and spread between the devices and the data servers even during the auto-off period. In this case, when the devices are turned on automatically (auto-on), the emails are already available on the devices. The side effect of this solution is that the battery life on the devices is consumed by keeping the transceivers on even though the users do not need the data information during the device auto-off period.

A mobile device has a transceiver configured to be activated independently of the activation status of the mobile device.

SUMMARY OF THE INVENTION

Before a data device automatically turns on (auto-on), its transceiver is turned on first. The interval between its transceiver on and the device auto-on is randomized to reduce the probability of synchronization with the transceivers on other devices in the same network.

An alternate embodiment of the invention is that when a device is auto-on, it does not register with the data server immediately. Instead it waits for a back-off period of time. The interval between auto-on and the time that the device registers with the data server is also randomized to reduce the probability of synchronization with other devices on the same network. This alternate embodiment is suggested to be used for non-time critical information retrieval devices.

A further alternative embodiment of the invention is when a device is auto-on, it does not immediately turn on its transceiver. Instead it waits for a period of time. The interval between auto-on and the time the transceiver is turned on and registers with the data server is also randomized to reduce the probability of synchronization with other devices on the same network. This alternate embodiment is suggested to be used for non-time critical information retrieval devices.

The present invention therefore provides a method, in a network comprising data devices having wireless transmitters and receivers, of temporally spreading network traffic associated with auto-on functionality of said data devices comprising the steps of: activating transceivers of said data devices prior to auto-on of said data devices in an unsynchronized manner; and receiving information on said receivers of said data devices prior to said auto-on of said data devices.

The present invention further provides a method, in a network comprising data devices having wireless transmitters and receivers, of temporally spreading network traffic associated with auto-on functionality of said data devices comprising the steps of: activating transceivers of said data devices after an auto-on of said data devices in an unsynchronized manner; and receiving information on said receivers of said data devices after said activating step.

The present invention still further provides a method, in a network comprising data devices having transmitters and receivers, of temporally spreading network traffic associated with auto-on functionality of said data devices comprising the steps of: registering with a data server in said network after an auto-on of said data devices in an unsynchronized manner; and receiving information from said data server after said registering step.

The present invention further provides a data device having an auto-on function that temporally spreads network traffic associated with said auto-on function, said data device comprising: a transmitter and receiver for communicating with a network; a battery to power said data device; a storage subsystem; and a microprocessor interacting with said storage subsystem and said transmitter and receiver, said microprocessor including a timer for activating said transceiver prior to or after activation of said auto-on function, wherein said timer is set for a variable duration and said transceiver is activated at the expiration of said timer to temporally spread network traffic.

BRIEF DESCRIPTION OF THE DRAWINGS

The same reference numerals are used in different figures to denote similar elements.

DETAILED DESCRIPTION OF THE DRAWINGS

Figure 1:
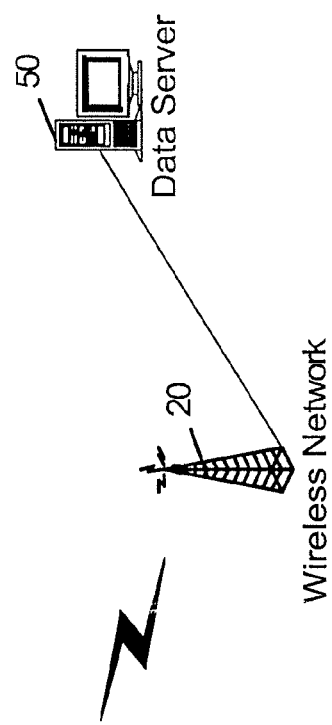
FIG. 1 is a block diagram of an exemplary wireless data device for use in an embodiment of the current invention.
Figure 1:
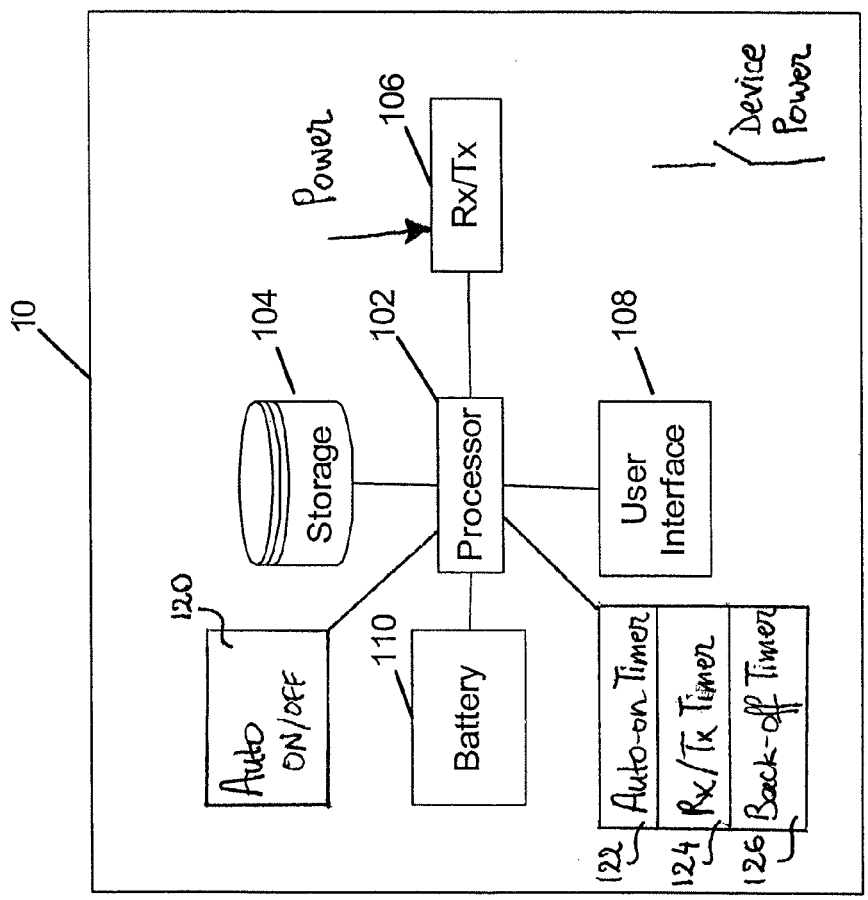

FIG. 1 is a block diagram of an exemplary wireless data device for use in an embodiment of the current invention. The wireless data device 10 is preferably a two-way communication device having at least data communication capabilities. Where the device 10 is enabled for two-way communications, the device will incorporate a processor 102, a storage subsystem 104, a transceiver subsystem 106, a user interface module 108 and battery 110. The microprocessor 102 controls the overall operation of the data device. Communication functions, including signaling and data communications between data device 10 and network 20 as well as between data device 10 and data server 50, are performed through the transceiver subsystem 106. The microprocessor 102 also interacts with further device subsystems such as the storage subsystem 104 and the user interface module 108. Users may read or compose email messages for instance through the user interface module 108; receive or send email messages via transceiver 106. Battery 110 is used to power wireless device 10.

A predetermined set of applications that control basic device operations, including at least data communication applications for example, will normally be installed on the device 10 during manufacture. A set of applications that may be loaded onto the device includes, but is not limited to e-mail, calendar events, appointments, browser and task items. Such applications would have the ability to perform data communications.

The processor 102 may set timers. An auto-on timer 122, a transceiver-on timer 124 and a back-off timer 126 may be used to provide auto-on functionality 120.

Figure 2:
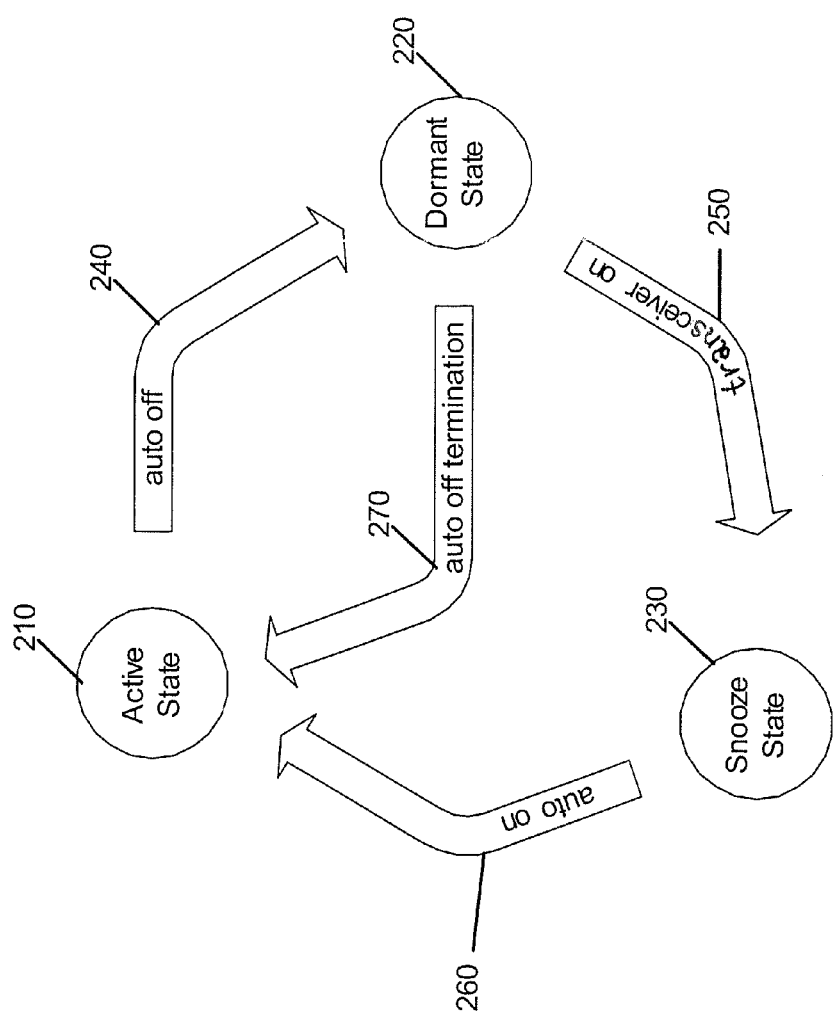
FIG. 2 is a state transition diagram in accordance with an embodiment current invention.

FIG. 2 is a state transition diagram in accordance with an embodiment current invention. There are three states associated with each data device 10—Active State 210, Dormant State 220 and Snooze State 230. When an auto-off 240 is triggered at data device 10, the auto-on timer 122 and the transceiver-on timer 124 will be started at data device 10, after which data device 10 does a transition 240 from Active State 210 to Dormant State 220. The transceiver-on timer 124 value of data device 10 is chosen in a way that the probability of synchronization with the transceiver-on from other devices 10 on the same network 20 is minimized. As will be appreciated by one skilled in the art, the auto-on timer 122 and the transceiver-on timer 124 may be countdown timers or may be comparators that expire upon reaching a predetermined time as measured by a local clock on said data device 10.

When the transceiver-on timer 124 expires, data device 10 does a receiver on 250 and moves to Snooze State 230. Data device 10 starts communicating with network 20 and data server 50 at state 230 and information is exchanged. However, in the snooze state 230 data device 10 may still appear inactive to the user. For instance, the user interface 108 may continue to be off or not updated; there are no alerts of arrival of new emails, or the like. Those skilled in art understand that the main purpose of Snooze State 230 is the spreading of data traffic for data devices 10 over time on the network 20.

Eventually auto-on 260 is triggered and data device 10 moves from Snooze State 230 to Active State 210. In Active State 210 a user may read or browse the information he already received at Snooze State 230. He may also continue to exchange information with network 20 and data server 50.

The state transition sequence may also be interrupted. As illustrated in FIG. 2, when data device 10 is in Dormant State 220, the user may force data device 10 to come out of Dormant State 220 and transition into Active State 210 by an auto off termination 270. In this case, Snooze State 230 is bypassed. The transceiver-on timer 124 and the auto-on 122 timer are cancelled if auto off termination 270 is used.

Figure 3:
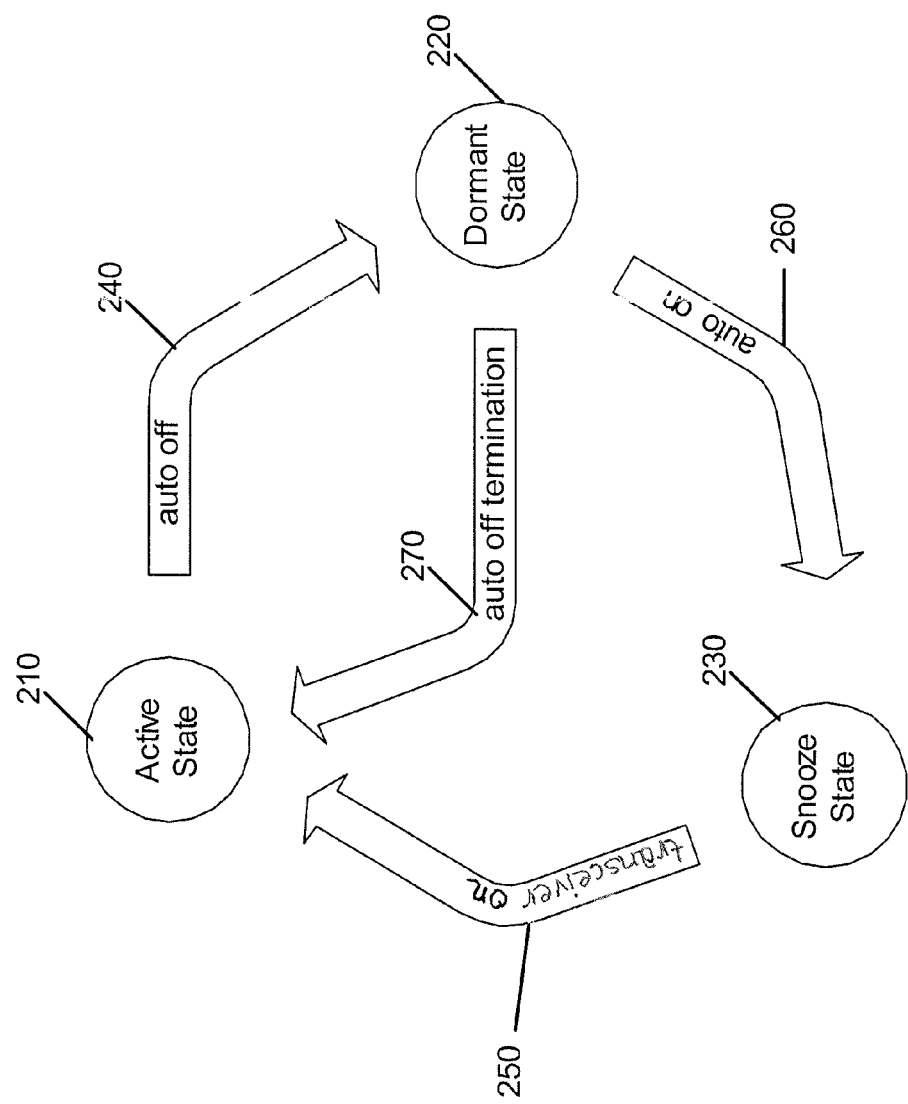
FIG. 3 is a state transition diagram in accordance with an alternate embodiment current invention.

Reference is now made to FIG. 3. In an alternate embodiment, the transition between Dormant State 220 and Snooze State 230 can also be triggered by auto-on 260 and in turn transceiver-on 250 triggers a transition between Snooze State 230 and Active State 210.

FIG. 3 is a state transition diagram in accordance with an alternate embodiment current invention. In Snooze State 230, data device 10 is prohibited from registering with the data server 50 immediately. Instead, a back-off timer 126 is started. The back-off timer 126 value of data device 10 is chosen in a way that the probability of synchronization with the back-off from other devices 10 on the same network 20 is minimized. As with the auto-on timer 122 and transceiver-on timer 124, the back-off timer 126 may be a countdown timer or comparator to a local clock on the data device 10.

When the back-off time period expires, data device 10 does a transceiver-on 250 and transits to Active State 210. Data device 10 starts communicating with network 20 and data server 50 at Active State 210 and information is exchanged.

As in FIG. 2, the state transition can also be interrupted by auto off termination 270. In this case, both the back-off timer 126 and the auto-on timer 122 are cancelled.

The embodiments described herein are examples of structures, systems or methods having elements corresponding to elements of the invention. This written description may enable those skilled in the art to make and use embodiments having alternative elements that likewise correspond to the elements of the invention. The intended scope of the invention thus includes other structures, systems or methods that do not differ from the invention as described herein, and further includes other structures, systems or methods with insubstantial differences from the invention as described herein.

I claim:

1. A method of pacing network traffic associated with the activation of a mobile data device of a plurality of mobile data devices, the plurality of mobile data devices communicating over a wireless communications network with a data server, each mobile data device having a transceiver configured to be activated before or after activating the mobile data device, the method comprising:
    determining an auto-on time when at least a portion of the mobile data device is to be activated, the auto-on time being specified via an auto-on time value;
    reducing the probability of synchronization with the transceivers on other devices in the same network by selecting a transceiver-on time value from random time values about the auto-on time value;
    activating the transceiver of the mobile data device at a transceiver-on time corresponding to the selected transceiver-on time value; and
    registering the mobile data device with the data server subsequent to activating the transceiver.

2. A method as claimed in claim 1, wherein subsequent to selecting the transceiver-on timer value the method further comprises the step of causing the mobile data device to undergo an auto-off transition.

3. A method as claimed in claim 1, wherein subsequent to selecting the transceiver-on timer value the method further comprises deactivating the transceiver.

4. A method as claimed in claim 2 further comprising activating the mobile data device, independent of the transceiver, at the auto-on time.

5. A method as claimed in claim 1, wherein subsequent to selecting the transceiver-on timer value the method further comprises causing the mobile data device to enter one of a dormant state, an idle state, a low power state, a power conservation state, a stand-by state, and a hibernation state.

6. A method as claimed in claim 1, wherein the transceiver-on time value represents one of a time before the auto-on time, and a time after the auto-on time.

7. A method as claimed in claim 1, wherein the transceiver comprises a wireless transmitter configured to be activated before or after activating the mobile data device, the method further comprising activating the transmitter at the transceiver-on time.

8. A method as claimed in claim 1, wherein the transceiver-on time value comprises a back-off time value, the method further comprising:
   selecting a random back-off time value from random time values coming after the auto-on time value; and
   activating the transceiver at the transceiver-on time comprises activating the transceiver at the back-off time specified via the back-off time value.

9. A method as claimed in claim 1, wherein the mobile data device further comprises a user interface, the transceiver being further configured to be activated independent of the user interface, the method further comprising activating the user interface at the auto-on time.

10. A method as claimed in claim 1, wherein selecting a transceiver-on time value, the method further comprises selecting the transceiver-on time value independent of any other mobile data device of the plurality of mobile data devices.

11. A mobile data device of a plurality of mobile data devices each configured to spread network traffic associated with the activation of the mobile data device, the mobile data device comprising:
   a transceiver for communicating with a network;
   a user interface, for interacting with a user;
   a microprocessor configured to activate the transceiver and the user interface independently;
   wherein the microprocessor reduces the probability of synchronization with other mobile data devices by maintaining an auto-on timer and a transceiver-on timer, the value of the transceiver-on timer being selected from random values about the value of the auto-on timer; and
   wherein the microprocessor is further configured to:
      activate the user interlace at the expiry of the auto-on timer;
      activate the transceiver at the expiry of the transceiver-on timer;
      register with the a data server subsequent to the activation of the transceiver.

12. The mobile data device as claimed in claim 11, wherein the transceiver-on timer value represents a time before the auto-on time.

13. The mobile data device as claimed in claim 11, wherein the transceiver-on timer value represents a time after the auto-on time.

14. A mobile data device as claimed in claim 11, wherein the transceiver-on timer comprises a back-off timer and wherein the microprocessor is further configured to activate the transceiver at the expiry of the back-off timer; the microprocessor being configured to select a random back-off timer value from random time values falling after the auto-on timer value.

15. A mobile data device as claimed in claim 11, wherein the microprocessor is configured to select the value of the transceiver-on timer independently of any other mobile data device in the plurality of mobile data devices.

* * * * *